(12) United States Patent
Hosotani (10) Patent No.: US 9,130,467 B2
(45) Date of Patent: *Sep. 8, 2015

(54) SWITCHING POWER SUPPLY DEVICE

(71) Applicant: MURATA MANUFACTURING CO., LTD., Kyoto-fu (JP)

(72) Inventor: Tatsuya Hosotani, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,679

(22) Filed: Apr. 18, 2014

(65) Prior Publication Data

US 2014/0247625 A1    Sep. 4, 2014

Related U.S. Application Data

(63) Continuation of application No. PCT/JP2012/076396, filed on Oct. 12, 2012.

(30) Foreign Application Priority Data

Oct. 21, 2011    (JP) ................................ 2011-232306

(51) Int. Cl.
*H02M 3/335*    (2006.01)
*H02M 7/48*    (2007.01)
*H02M 1/00*    (2007.01)

(52) U.S. Cl.
CPC ...... *H02M 3/33507* (2013.01); *H02M 3/33569* (2013.01); *H02M 3/33576* (2013.01);
(Continued)

(58) Field of Classification Search
USPC .................................................... 363/17–25
See application file for complete search history.

(56) References Cited

U.S. PATENT DOCUMENTS 5,729,444 A    3/1998  Perol
5,748,457 A *  5/1998  Poon et al. ...................... 363/16
(Continued)

FOREIGN PATENT DOCUMENTS

JP    05-091740 A    4/1993
JP    05-176531 A    7/1993
(Continued)

OTHER PUBLICATIONS

International Search Report; PCT/JP2012/076396; Nov. 6, 2012.
Written Opinion of the International Searching Authority; PCT/JP2012/076396; Nov. 6, 2012.
(Continued)

*Primary Examiner* — Jessica Han
(74) *Attorney, Agent, or Firm* — Studebaker & Brackett PC (57) ABSTRACT

A primary side resonant circuit is formed by a primary side resonant inductor and a primary side resonant capacitor, and secondary side resonant circuits are formed by secondary side resonant inductors and secondary side resonant capacitors. Mutual inductances are formed equivalently through magnetic field resonant coupling between a primary winding and secondary windings, and a multi-resonant circuit that includes two or more LC resonant circuits is formed by a primary side circuit and a secondary side circuit. Electric power is transmitted from the primary side circuit to the secondary side circuit; resonant energy that is not transmitted from the primary winding and, of energy which the secondary winding has received, resonant energy that is not supplied to an output are each retained in the multi-resonant circuit; and, at the secondary side, the resonant energy is retained in a current path in which a rectifying element is not formed in series.

18 Claims, 6 Drawing Sheets

(52) U.S. Cl.
CPC ..... *H02M7/4826* (2013.01); *H02M 2001/0058* (2013.01); *H02M 2007/4815* (2013.01); *Y02B 70/1433* (2013.01); *Y02B 70/1491* (2013.01)

(56) References Cited

U.S. PATENT DOCUMENTS

| | | | |
|---|---|---|---|
| 6,184,630 B1 * | 2/2001 | Qian et al. | 315/224 |
| 6,246,599 B1 * | 6/2001 | Jang et al. | 363/132 |
| 2002/0071294 A1 | 6/2002 | Yasumura | |
| 2006/0077600 A1 | 4/2006 | Yasumura | |
| 2006/0176034 A1 | 8/2006 | Skinner | |
| 2007/0008744 A1 | 1/2007 | Heo et al. | |
| 2010/0328967 A1 * | 12/2010 | Cody et al. | 363/21.02 |
| 2013/0300210 A1 | 11/2013 | Hosotani | |
| 2013/0301306 A1 | 11/2013 | Hosotani | |
| 2013/0301308 A1 | 11/2013 | Hosotani | |

FOREIGN PATENT DOCUMENTS

| | | |
|---|---|---|
| JP | 05-176532 A | 7/1993 |
| JP | 07-255169 A | 10/1995 |
| JP | 08-196074 A | 7/1996 |
| JP | 09-308243 A | 11/1997 |
| JP | 2002-159178 A | 5/2002 |
| JP | 2006-500889 A | 1/2006 |
| JP | 2006-074897 A | 3/2006 |
| JP | 2006-101651 A | 4/2006 |
| JP | 2006-197753 A | 7/2006 |
| JP | 2007-020391 A | 1/2007 |
| JP | 2008-104295 A | 5/2008 |
| WO | 2012/101905 A1 | 8/2012 |
| WO | 2012/101906 A1 | 8/2012 |
| WO | 2012/101907 A1 | 8/2012 |

* cited by examiner

PRIOR ART

SWITCHING POWER SUPPLY DEVICE

CROSS REFERENCE TO RELATED APPLICATIONS

This application claims benefit of priority to Japanese Patent Application No. 2011-232306 filed on Oct. 21, 2011, and to International Patent Application No. PCT/JP2012/076396 filed on Oct. 12, 2012, the entire content of each of which is incorporated herein by reference.

TECHNICAL FIELD

The present technical field relates to switching power supply devices and, in particular, to a switching power supply device that transmits electric power through a multi-resonant circuit.

BACKGROUND

Electronic devices have been reduced in size and weight in recent years, and there has been an increasing market demand for switching power supplies with increased efficiency and reduced size and weight. For example, in the market for flat screen television sets or the like, in which output current ripple characteristics are relatively moderate, a current resonant half bridge converter in which a sinusoidal resonant current is made to flow in a transformer to cause the transformer to operate while utilizing an LC resonance phenomenon is being put to practical use while taking advantage of its feature of being highly efficient.

Figure 13:
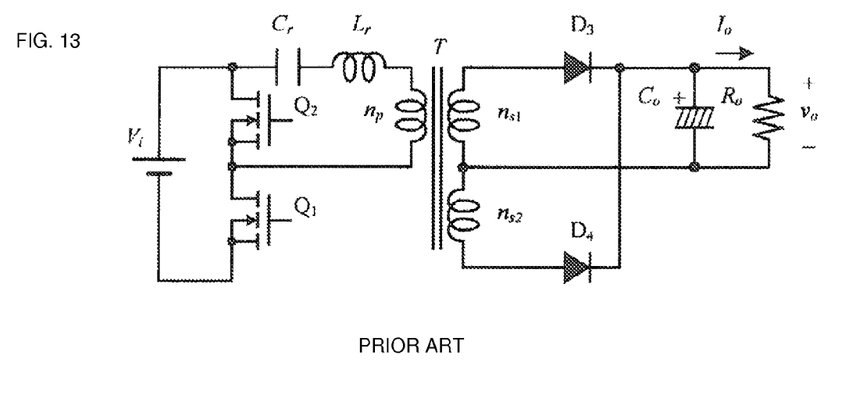
FIG. 13 is a basic circuit diagram of a switching power supply device described in Japanese Unexamined Patent Application Publication No. 9-308243.

For example, Japanese Unexamined Patent Application Publication No. 9-308243 discloses an LC series resonant DC-DC converter. FIG. 13 is a basic circuit diagram of a switching power supply device described in Japanese Unexamined Patent Application Publication No. 9-308243. This switching power supply device is a current resonant half bridge DC-DC converter, in which an LC resonant circuit that is formed by an inductor Lr and a capacitor Cr and two switching elements Q1 and Q2 are connected to a primary winding np of a transformer T. A rectifying smoothing circuit that is formed by diodes D3 and D4 and a capacitor Co is formed on secondary windings ns1 and ns2 of the transformer T.

With the configuration described above, the switching elements Q1 and Q2 are complementarily turned on and off with a dead time, and the waveform of a current that flows through the transformer T thus has a sinusoidal resonant waveform. In addition, electric power is transmitted from the primary side to the secondary side during both on periods and off periods of the two switching elements Q1 and Q2.

SUMMARY

Technical Problem

The switching power supply device described in Japanese Unexamined Patent Application Publication No. 9-308243, however, suffers from the following issues to be solved.

(1) The LC resonant circuit is formed only at the primary side (or the secondary side); a mutual inductance Lm is formed equivalently through magnetic coupling between the primary winding and the secondary winding; and electric power is transmitted through electromagnetic induction. A leakage flux that is not involved in the magnetic coupling, however, forms an equivalent leakage inductance, and magnetic energy of a secondary side leakage inductance leads to an electric power loss as a switching loss of a rectifying diode. In particular, in a case in which the magnetic coupling is small, the leakage inductance of the secondary winding increases, and in turn the electric power loss increases.

(2) In a case in which the magnetic coupling between the primary winding and the secondary winding is small, an impedance increases since a resonant circuit is not formed in the secondary side circuit. Thus, electric power cannot be transmitted efficiently from the primary side to the secondary side.

(3) Output electric power can be controlled through a change in a switching frequency fs. For example, the switching frequency fs is controlled to be higher when a load is light and to be lower when the load is heavy. The switching frequency fs, however, becomes excessively high when the load is light or is not present, and the output electric power goes out of control, leading to such problems as occurrence of an intermittent oscillation operation and a jump in an output voltage.

Accordingly, the present disclosure is directed to providing a switching power supply device with increased output stability and increased electric power conversion efficiency.

Solution to Problem

A switching power supply device according the present disclosure is configured as follows.

(1) The switching power supply device includes a transformer that includes at least a primary winding and a secondary winding;

a primary side circuit that includes a primary side resonant inductor Lr formed so as to be equivalent to and in series with the primary winding, a primary side resonant capacitor Cr that, together with the primary side resonant inductor Lr, forms a primary side resonant circuit, and a primary side alternating current voltage generation circuit that includes at least two switching elements and that generates a trapezoidal wave alternating current voltage from an input direct current power supply voltage so as to provide the alternating current voltage to the primary side resonant circuit; and a secondary side circuit that includes a secondary side resonant inductor Ls formed so as to be equivalent to and in series with the secondary winding, a secondary side resonant capacitor Cs that forms, together with the secondary side resonant inductor Ls, a secondary side resonant circuit, and a secondary side rectifying circuit that includes a rectifying element and that rectifies an alternating current outputted from the secondary side resonant circuit so as to obtain a direct current voltage.

In the switching power supply device, a mutual inductance Lm is formed equivalently through magnetic field resonant coupling between the primary winding and the secondary winding, and a multi-resonant circuit that includes a plurality of LC resonant circuits is formed by at least the primary side circuit and the secondary side circuit.

With the multi-resonant circuit, the primary side resonant circuit and the secondary side resonant circuit resonate with each other, and electric power is thus transmitted from the primary side circuit to the secondary side circuit through magnetic field resonant coupling in which a current flows through the mutual inductance Lm;

energy that is not transmitted from the primary winding is retained in the primary side resonant circuit as resonant energy through a resonance phenomenon;

of energy which the secondary winding has received, energy that is not supplied to an output is retained in the secondary side resonant circuit as resonant energy through a resonance phenomenon; and the secondary side resonant circuit forms current paths (path through ns1(Lms1)-Ls1-Cs1 and path through ns2 (Lms2)-Ls2-Cs2) that are different from a current path in which the rectifying element is formed in series to transmit electric power from the primary winding to the secondary winding.

According to the configuration described above, the equivalent mutual inductance can be formed through mutual induction between the primary winding and the secondary winding; the primary side resonant circuit and the secondary side resonant circuit can be made to resonate with each other through the multi-resonant circuit; and electric power can be transmitted efficiently from the primary side circuit to the secondary side circuit through magnetic field resonant coupling. In addition, when the rectifying element becomes nonconducting, the inductor Ls and the capacitor Cs resonate with each other so as to be retained as resonant energy, and thus an electric power loss can be suppressed.

(2) It is preferable that, when a switching frequency is represented by fs and a resonance frequency at which an input impedance seen by an input of the multi-resonant circuit connected to the primary side alternating current voltage generation circuit in a state in which a load is connected to an output of the secondary side circuit becomes minimum is represented by fa, the primary side alternating current voltage generation circuit operates within a range in which fa≤fs is satisfied to control electric power to be transmitted.

According to the configuration described above, irrespective of the state of the load, the input impedance of the multi-resonant circuit seen by the primary side alternating current voltage generation circuit is an inductive impedance. Thus, a zero voltage switching operation can be achieved in the switching element that forms the primary side alternating current voltage generation circuit, and the output electric power can be controlled to a desired level relative to the change in the state of the load. In addition, a zero voltage switching (hereinafter, "ZVS") in a broad sense or zero current switching (hereinafter, "ZCS") operation in which the waveform of a voltage or a current across two ends of the rectifying element becomes part of a sinusoidal wave so as to lead to a conducting state or a nonconducting state becomes possible, reducing a switching loss. Efficiency can thus be improved.

(3) It is preferable that, as the secondary side resonant circuit is provided, the switching power supply device operates within a range in which fa≤fs≤fc is satisfied to control electric power to be transmitted while a predetermined frequency fc at which a resonant operation is maintained even in a no-load state in which a load is not connected to an output is set.

According to the configuration described above, the output electric power can be controlled within a desired operation frequency range.

(4) It is preferable that the secondary side resonant capacitor Cs be connected in parallel with the secondary winding and that the secondary side rectifying circuit be configured to rectify a voltage of the secondary side resonant capacitor Cs.

According to the configuration described above, the ZVS or ZCS operation of the rectifying element becomes possible, and thus a switching loss can be reduced, leading to improved efficiency. In addition, using a stray capacitance of the winding as the resonant capacitor allows the number of components to be reduced to thus reduce the power supply device in size and weight.

(5) It is preferable that the secondary side resonant capacitor Cs be connected in series with the secondary winding and that the secondary side rectifying circuit be configured to rectify a current in the secondary side resonant capacitor Cs.

According to the configuration described above, the ZVS or ZCS operation of the rectifying element becomes possible, and thus a switching loss can be reduced, leading to improved efficiency.

(6) It is preferable that the secondary side resonant capacitor Cs be connected in parallel with the rectifying element that forms the secondary side rectifying circuit.

According to the configuration described above, the ZVS or ZCS operation of the rectifying element becomes possible, and thus a switching loss can be reduced, leading to improved efficiency. In addition, using a stray capacitance of the rectifying element as the resonant capacitor allows the number of components to be reduced to thus reduce the power supply device in size and weight.

(7) The secondary side rectifying circuit is, for example, a bridge rectifying circuit.

According to the configuration described above, a withstanding voltage required for the rectifying element can be reduced.

(8) The secondary side rectifying circuit is, for example, a center tap rectifying circuit.

According to the configuration described above, an output current can be supplied through two rectifying elements and two secondary windings, and thus the efficiency can be improved in a use case in which an output current is large.

(9) The secondary side rectifying circuit is, for example, a voltage doubling rectifying circuit.

According to the configuration described above, a high voltage can be supplied through a single secondary winding, and thus the efficiency can be improved in a use case in which an output voltage is high.

(10) It is preferable that the switching element be turned on when a voltage across two ends thereof falls to a zero voltage to carry out a zero voltage switching operation.

According to the configuration described above, a component for the resonant inductor becomes unnecessary, and thus the switching power supply device can be reduced in size and weight.

(11) It is preferable that the primary side resonant inductor Lr or the secondary side resonant inductor Ls be a leakage inductance of the primary winding or the secondary winding.

According to the configuration described above, the number of components can be reduced, and the power supply device can thus be reduced in size and weight.

(12) It is preferable that a stray capacitance of the primary winding, together with the primary side resonant capacitor Cr, form the primary side resonant circuit, or that a stray capacitance of the secondary winding, together with the secondary side resonant capacitor Cs, form the secondary side resonant circuit.

According to the configuration described above, the number of components can be reduced, and the power supply device can thus be reduced in size and weight.

(13) It is preferable that a junction capacitance of the rectifying element be used as the secondary side resonant capacitor Cs.

According to the configuration described above, the number of components can be reduced, and the power supply device can thus be reduced in size and weight.

(14) It is preferable that a diode connected in parallel with the switching element be provided.

(15) It is preferable that the switching element be an FET, the diode connected in parallel be a parasitic diode of the FET, and a parasitic capacitance of the FET be used as a parallel capacitor.

According to the configuration described above, the number of components can be reduced, and the power supply device can thus be reduced in size and weight.

(16) It is preferable that a resonance frequency of the primary side resonant circuit be substantially equal to a resonant frequency of the secondary side resonant circuit.

According to the configuration described above, electric power transmission efficiency is improved. In addition, a resonant frequency band of the magnetic field resonant coupling can be broadened.

(17) It is preferable that the primary side alternating current voltage generation circuit be a circuit in which four switching elements are in full bridge connection.

According to the configuration described above, a withstanding voltage required for the switching element can be reduced.

(18) It is preferable that the secondary side rectifying circuit be a synchronous rectifying circuit that rectifies in synchronization with an operation of the switching circuit in the primary side alternating current voltage generation circuit.

According to the configuration described above, allowing the switching element that forms the synchronous rectifying circuit to undergo a switching operation makes it possible to transmit electric power reception side energy, which makes it possible to use an electric power reception side circuit as an electric power transmission circuit. In this manner, for example, bidirectional electric power transmission becomes possible.

Advantageous Effects of Disclosure

According to the present disclosure, the following advantageous effects are obtained.

(a) The equivalent mutual inductance can be formed through the magnetic field resonant coupling between the primary winding np and the secondary windings (ns, ns1, ns2); the primary side resonant circuit and the secondary side resonant circuit can resonate with each other through the multi-resonant circuit; and electric power can be transmitted efficiently from the primary side circuit to the secondary side circuit.

(b) When a rectifying diode becomes nonconducting, resonant inductors (Ls, Ls1, Ls2) and capacitors (Cs, Cs1, Cs2) resonate with one another so as to be retained as resonant energy, and thus an electric power loss can be suppressed.

(c) Setting an impedance of the multi-resonant circuit as an inductive impedance in which the phase of a current is delayed relative to the phase of a voltage at a primary side alternating current voltage generation circuit enables ZVS operations of switching elements Q1 and Q2 throughout the entire load range, and the switching loss can thus be greatly reduced to improve efficiency.

(d) ZVS and ZCS operations of a rectifying element become possible, and the switching loss can thus be reduced to improve efficiency.

DETAILED DESCRIPTION

First Embodiment

Figure 1:
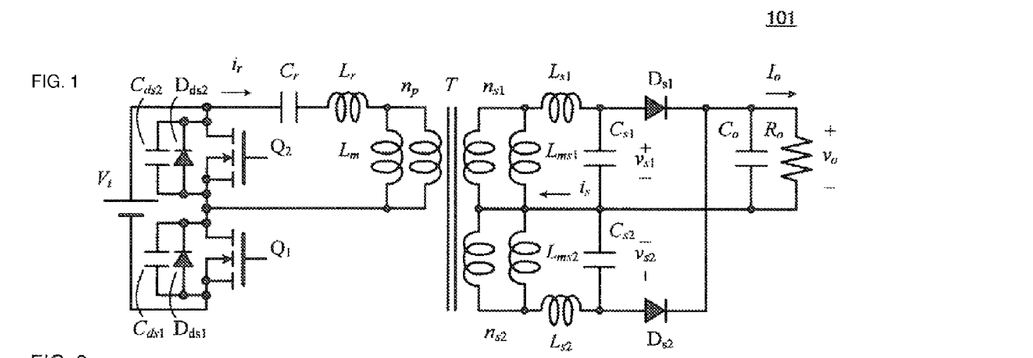
FIG. 1 is a circuit diagram of a switching power supply device 101 according to a first embodiment.

FIG. 1 is a circuit diagram of a switching power supply device 101 according to a first embodiment.

The switching power supply device 101 is a circuit that accepts input of an input power supply Vi through an input unit and stably supplies a direct current voltage to a load Ro from an output unit. The switching power supply device 101 includes each of the following elements.

- A transformer T that includes a primary winding np and secondary windings ns1 and ns2.
- A primary side resonant inductor Lr that is formed so as to be equivalent to and in series with the primary winding np.
- At least one primary side resonant capacitor Cr that, together with the resonant inductor Lr, forms a primary side resonant circuit.
- Two switching circuits that are formed, respectively, by switching elements Q1 and Q2, antiparallel diodes Dds1 and Dds2, and parallel capacitors Cds1 and Cds2.
- A primary side alternating current voltage generation circuit that generates a trapezoidal wave (rectangular wave) alternating current voltage from an input direct current power supply voltage through the aforementioned switching circuits and provides the alternating current voltage to the primary side resonant circuit.
- Secondary side resonant inductors Ls1 and Ls2 that are formed so as to be equivalent to and in series with the secondary windings ns1 and ns2.
- Secondary side resonant capacitors Cs1 and Cs2 that, together with the resonant inductors Ls1 and Ls2, form a secondary side resonant circuit
- A secondary side rectifying circuit that includes diodes Ds1 and Ds2 and rectifies an alternating current outputted from the secondary side resonant circuit to obtain a direct current voltage.
- Equivalent mutual inductances Lm, Lms1 and Lms2 are formed through mutual induction between the primary winding np and the secondary windings ns1 and ns2, and a multi-resonant circuit that includes a plurality of LC resonant circuits is formed by the primary side circuit and the secondary side circuit.

Characteristic configurations of this switching power supply device can be described briefly as follows.

An LC resonant circuit is provided at each of the primary side and the secondary side, and electric power is transmitted efficiently through a magnetic field resonant coupling.

An LC resonant circuit that is formed by Cs1, Ls1, and Lms1 and another LC resonant circuit that is formed by Cs2, Ls2, and Lms2 are provided at the secondary side.

An LC resonant circuit that is formed by Lr, Cr, and Lm is provided at the primary side.

The multi-resonant circuit is formed by Cr, Lm, Lr, Cs1, Ls1, Lms1, Cs2, Ls2, and Lms2.

The operations of this switching power supply device 101 are as follows.

(1) The equivalent mutual inductances Lm, Lms1, and Lms2 are formed through mutual induction between the primary winding np and the secondary windings ns1 and ns2; the multi-resonant circuit that is formed by Cr, Lr, Lm, Cs1, Ls1, Lms1, Cs2, Ls2, and Lms2 causes the primary side resonant circuit and the secondary side resonant circuit to resonate with each other; and electric power is transmitted from the primary side circuit to the secondary side circuit due to the magnetic field resonant coupling in which resonant currents flow through the mutual inductances Lm, Lms1, and Lms2.

(2) The inductor Ls1 and the capacitor Cs1 resonate with each other when the diode Ds1 becomes nonconducting or conducting.

(3) The inductor Ls2 and the capacitor Cs2 resonate with each other when the diode Ds2 becomes nonconducting or conducting.

(4) The switching elements Q1 and Q2 are turned on and off in an alternating manner with a dead time, and thus a trapezoidal alternating current voltage waveform is generated from the direct current voltage V1. This trapezoidal alternating current voltage waveform becomes an alternating current waveform of a sinusoidal waveform or of a partially sinusoidal waveform through a resonance phenomenon by the multi-resonant circuit that is formed by Cr, Lm, Lr, Cs1, Ls1, Lms1, Cs2, Ls2, and Lms2. Furthermore, the stated alternating current waveform is rectified by the diodes Ds1 and Ds2, and a direct current voltage is thus generated.

(5) When fa represents a resonance frequency at which an input impedance seen by an input of the multi-resonant circuit that is connected to the primary side alternating current voltage generation circuit in a state in which a load is connected to an output of the secondary side circuit reaches the minimum, the switching power supply device 101 operates within a range in which fa≤fs is satisfied so as to control output electric power.

Figure 2:
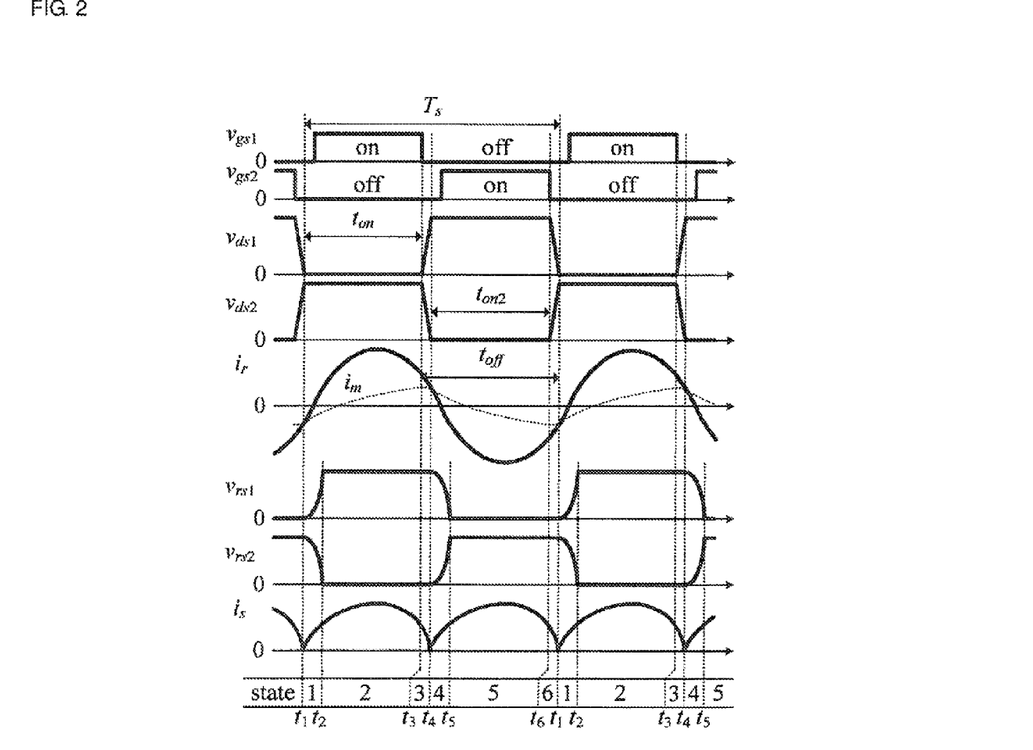
FIG. 2 illustrates a waveform of each element in the switching power supply device 101 illustrated in FIG. 1.

FIG. 2 illustrates a waveform of each element in the switching power supply device 101 illustrated in FIG. 1. With reference to FIG. 1 and FIG. 2, the operations of the switching power supply device 101 will be described.

Here, voltages across the gates and the sources of the switching elements Q1 and Q2 are represented by vgs1 and vgs2; voltages across the drains and the sources are represented by vds1 and vds2; voltages across the two ends of the diodes Ds1 and Ds2 are represented by vrs1 and vrs2; and a current that flows through a common ground of the secondary windings ns1 and ns2 is represented by $i_s$.

The switching elements Q1 and Q2 are turned on and off in an alternating manner with a short dead time, during which the switching elements are both turned off, and currents that flow through Q1 and Q2 during the dead time are each commutated, leading to the ZVS operation. The operation in each period within a single switching cycle is as follows.

(1) State 1 Times t1 to t2

First, the diode Dds1 becomes conducting. Turning on the switching element Q1 during a conducting period of the diode Dds1 causes the ZVS operation to be carried out, and the switching element Q1 becomes conducting. The equivalent mutual inductances Lm, Lms1, and Lms2 are formed through mutual induction between the primary winding np and the secondary windings ns1 and ns2; in the multi-resonant circuit that is formed by Cr, Lr, Lm, Cs1, Ls1, Lms1, Cs2, Ls2, and Lms2, the primary side resonant circuit and the secondary side resonant circuit resonate with each other; and electric power is transmitted from the primary side circuit to the secondary side circuit due to the magnetic field resonant coupling in which resonant currents flow through the mutual inductances Lm, Lms1, and Lms2. At the primary side, resonant currents flow through the capacitor Cr and the inductors Lr and Lm. At the secondary side, resonant currents flow through the capacitor Cs1 and the inductors Ls1 and Lms1 and through the capacitor Cs2 and the inductors Ls2 and Lms2. The capacitor Cs1 is charged, and the capacitor Cs2 discharges. A current is supplied to the load Ro from the capacitor Co. When a voltage vs1 becomes equal to an output voltage vo and a voltage vs2 becomes 0 V, the diode Ds1 becomes conducting, leading to State 2.

(2) State 2 Times t2 to t3

The equivalent mutual inductances Lm and Lms1 are formed through mutual induction between the primary winding np and the secondary winding ns1, and electric power is transmitted from the primary side circuit to the secondary side circuit due to magnetic field coupling. At the primary side, resonant currents flow through the capacitor Cr and the inductors Lr and Lm. At the secondary side, resonant currents flow through the inductors Ls1 and Lms1, and a current passes through the diode Ds1 to be supplied to the load Ro. Upon the switching element Q1 being turned off, State 3 starts.

(3) State 3 Times t3 to t4

At the primary side, the capacitor Cds1 is charged with a current it that has flowed through the inductor Lr, and the capacitor Cds2 discharges. At the secondary side, the current from the inductor Ls1 flows through the diode Ds1 to be supplied to the load Ro. When the voltage vds1 becomes the voltage V1 and the voltage vds2 becomes 0 V, the diode Dds2 becomes conducting, leading to State 4.

(4) State 4 Times t4 to t5

First, the diode Dds2 becomes conducting. Turning on the switching element Q2 during a conducting period of the diode Dds2 causes the ZVS operation to be carried out, and the switching element Q2 becomes conducting. The equivalent mutual inductances Lm, Lms1, and Lms2 are formed through mutual induction between the primary winding np and the secondary winding ns1 and ns2; in the multi-resonant circuit that is formed by Cr, Lr, Lm, Cs1, Ls1, Lms1, Cs2, Ls2, and Lms2, the primary side resonant circuit and the secondary side resonant circuit resonate with each other; and electric power is transmitted from the primary side circuit to the secondary side circuit due to the magnetic field resonant coupling in which resonant currents flow through the mutual inductances Lm, Lms1, and Lms2. At the primary side, resonant currents flow through the capacitor Cr and the inductors Lr and Lm. At the secondary side, resonant currents flow through the capacitor Cs1 and the inductors Ls1 and Lms1 and through the capacitor Cs2 and the inductors Ls2 and Lms2. The capacitor Cs1 discharges, and the capacitor Cs2 is charged. A current is supplied to the load Ro from the capacitor Co. When the voltage vs1 becomes 0 V and the voltage vs2 becomes equal to the output voltage vo, the diode Ds2 becomes conducting, leading to State 5.

(5) State 5 Times t5 to t6

The equivalent mutual inductances Lm and Lms2 are formed through mutual induction between the primary winding np and the secondary winding ns2, and electric power is transmitted from the primary side circuit to the secondary side circuit due to magnetic field coupling. At the primary side, resonant currents flow through the capacitor Cr and the inductors Lr and Lm. At the secondary side, resonant currents flow through the inductors Ls2 and Lms2, and a current passes through the diode Ds2 to be supplied to the load Ro. Upon the switching element Q2 being turned off, State 6 starts.

(6) State 6 Times t6 to t1

At the primary side, with the current it that has flowed through the inductor Lr, the capacitor Cds1 discharges, and the capacitor Cds2 is charged. At the secondary side, the current from the inductor Ls2 flows through the diode Ds2 to be supplied to the load Ro. When the voltage vds1 becomes 0 V, and the voltage vds2 becomes the voltage V1, the diode Dds1 becomes conducting, leading again to State 1.

Thereafter, States 1 through 6 are repeated cyclically.

According to the first embodiment, the following advantageous effects are obtained.

(a) The equivalent mutual inductance can be formed through mutual induction between the primary winding np and the secondary winding ns1; the primary side resonant circuit and the secondary side resonant circuit can resonate with each other through the multi-resonant circuit; and electric power can be transmitted efficiently from the primary side circuit to the secondary side circuit due to the magnetic field resonant coupling.

(b) When the diode Ds1 becomes nonconducting, the inductor Ls1 and the capacitor Cs1 resonate with each other so as to be retained as resonant energy, and thus an electric power loss can be suppressed.

(c) When the diode Ds2 becomes nonconducting, the inductor Ls2 and the capacitor Cs2 resonate with each other so as to be retained as resonant energy, and thus an electric power loss can be suppressed.

(d) Setting the impedance of the multi-resonant circuit to an inductive impedance in which the phase of a current is delayed relative to the phase of a voltage at the primary side alternating current voltage generation circuit enables the ZVS operations of the switching elements Q1 and Q2 throughout the entire load range. Consequently, a switching loss can be greatly reduced to improve efficiency.

(e) The ZVS and ZCS operations of the rectifying diode become possible, and a switching loss can be reduced to improve efficiency.

(f) Providing the LC resonant circuits that are formed by Cs1, Ls1, and Lms1, and Cs2, Ls2, and Lms2 at the secondary side makes it possible to control output electric power to desired output electric power by setting a frequency fc at which no-load electric power is achieved and by operating the switching power supply device within a range in which a switching frequency fs satisfies fs≤fc.

(g) Using MOS-FETs for the switching elements Q1 and Q2 makes it possible to form a switching circuit by using a parasitic capacitance and an antiparallel diode, and thus the number of components can be reduced to reduce the power supply device in size and weight.

(h) Using leakage inductances of the winding as the resonant inductors Lr, Ls1, and Ls2 makes it possible to reduce the number of components to thus reduce the power supply device in size and weight.

(i) Using mutual inductances of the transformer T as the resonant inductors Lm, Lms1, and Lms2 makes it possible to reduce the number of components to thus reduce the power supply device in size and weight.

(j) Using stray capacitances of the winding as the resonant capacitors Cs1 and Cs2 makes it possible to reduce the number of components to thus reduce the power supply device in size and weight.

(k) Using junction capacitances of the rectifying diodes Ds1 and Ds2 as resonant capacitors makes it possible to reduce the number of components to thus reduce the power supply device in size and weight.

Second Embodiment

Figure 3:
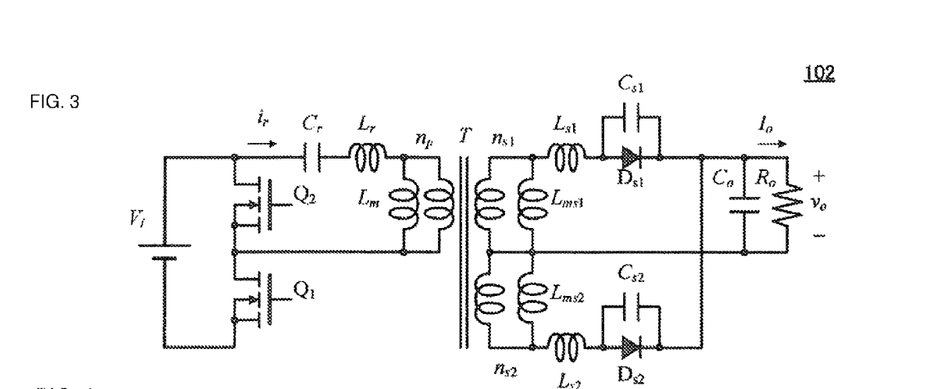
FIG. 3 is a circuit diagram of a switching power supply device 102 according to a second embodiment.

FIG. 3 is a circuit diagram of a switching power supply device 102 according to a second embodiment. In this example, unlike the switching power supply device 101 of the first embodiment, the secondary side resonant capacitors Cs1 and Cs2 are connected in parallel with the diodes Ds1 and Ds2, respectively. In addition, the antiparallel diodes Dds1 and Dds2 illustrated in FIG. 1 are constituted by parasitic diodes of the switching elements Q1 and Q2, respectively.

Operations and effects are similar to those described in the first embodiment. In particular, in the second embodiment, junction capacitances of the diodes Ds1 and Ds2 can be used as the secondary side resonant capacitors Cs1 and Cs2.

Third Embodiment

Figure 4:
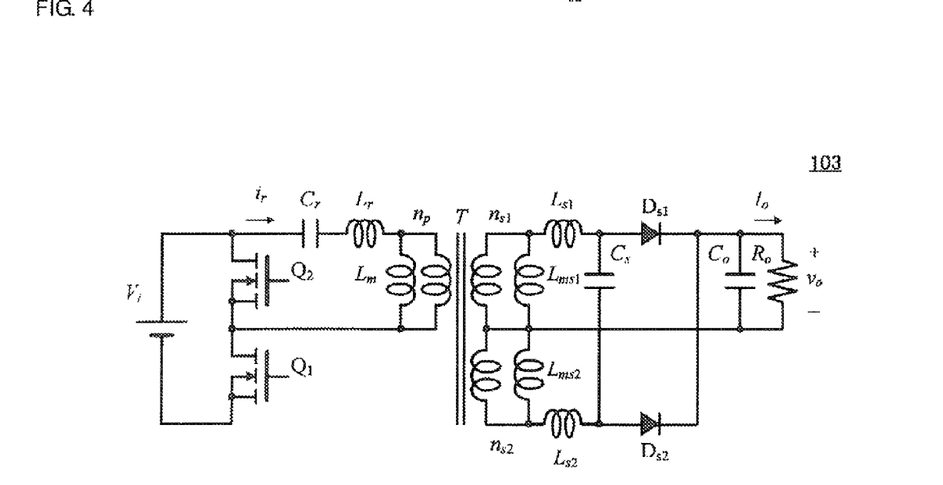
FIG. 4 is a circuit diagram of a switching power supply device 103 according to a third embodiment.

FIG. 4 is a circuit diagram of a switching power supply device 103 according to a third embodiment. In this example, unlike the switching power supply device 101 of the first embodiment, the secondary side resonant capacitor is constituted by a single capacitor Cs.

Operations and effects are similar to those described in the first embodiment. In particular, in the third embodiment, the secondary side resonant capacitor Cs can be constituted by a single capacitor, and thus the number of components can be reduced.

Fourth Embodiment

Figure 5:
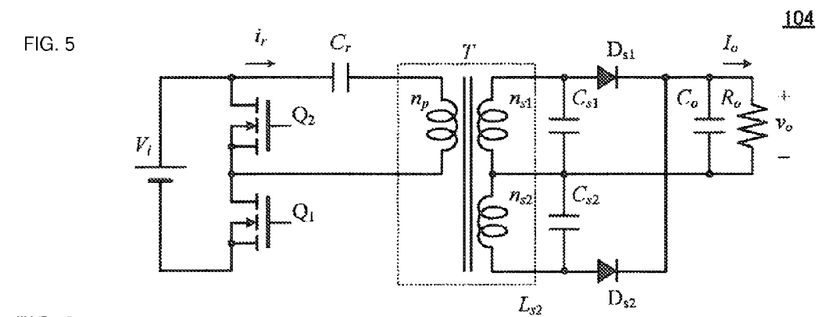
FIG. 5 is a circuit diagram of a switching power supply device 104 according to a fourth embodiment.

FIG. 5 is a circuit diagram of a switching power supply device 104 according to a fourth embodiment. In this example, unlike the switching power supply device 101 of the first embodiment, leakage inductances of the winding are used as the inductors Lr, Ls1, and Ls2, and mutual inductances of the transformer T are used as the inductors Lm, Lms1, and Lms2.

Operations and effects are similar to those described in the first embodiment. In particular, in the fourth embodiment, the number of components can be reduced.

Fifth Embodiment

Figure 6:
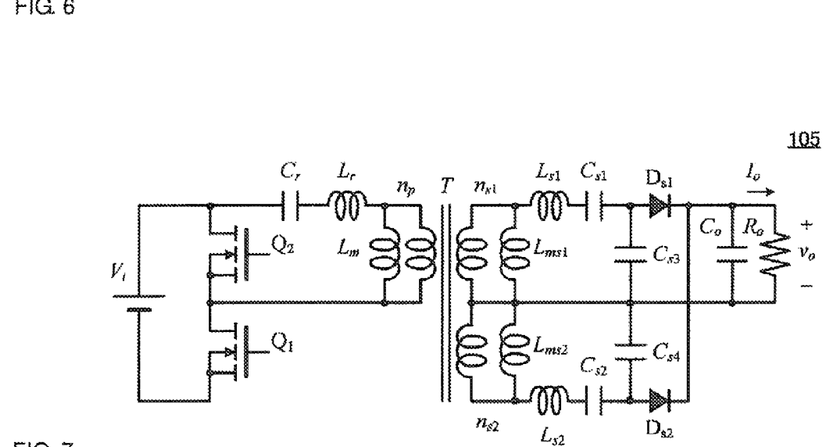
FIG. 6 is a circuit diagram of a switching power supply device 105 according to a fifth embodiment.

FIG. 6 is a circuit diagram of a switching power supply device 105 according to a fifth embodiment. In this example, unlike the switching power supply device 101 of the first embodiment, the capacitors Cs1 and Cs2 are formed so as to be in series with the inductors Ls1 and Ls2, respectively, and capacitors Cs3 and Cs4 are connected in parallel with the output.

Operations and effects are similar to those described in the first embodiment. In particular, in the fifth embodiment, the frequency fc can be set to a desired value by setting the values of the capacitors Cs1 to Cs4 as appropriate.

Sixth Embodiment

Figure 7:
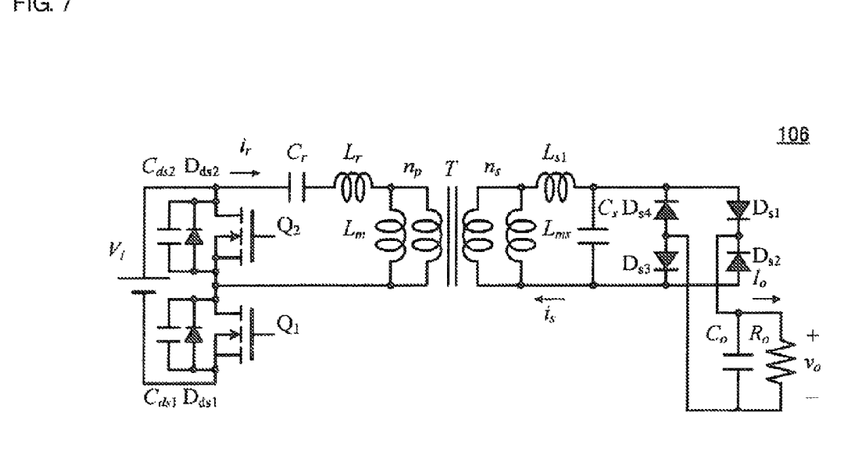
FIG. 7 is a circuit diagram of a switching power supply device 106 according to a sixth embodiment.

FIG. 7 is a circuit diagram of a switching power supply device 106 according to a sixth embodiment. In this example, unlike the switching power supply device 101 of the first embodiment, a bridge rectifying circuit is formed as a rectifying circuit.

Operations and effects are similar to those described in the first embodiment. In particular, in the sixth embodiment, the secondary winding can be constituted by a single winding, and the capacitor Cs can be constituted by a single capacitor.

Seventh Embodiment

Figure 8:
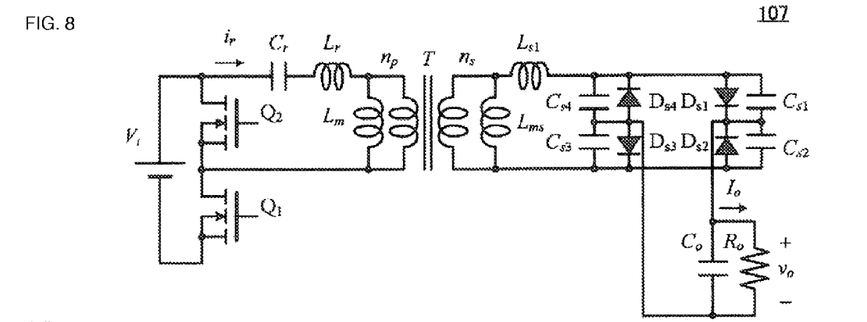
FIG. 8 is a circuit diagram of a switching power supply device 107 according to a seventh embodiment.

FIG. 8 is a circuit diagram of a switching power supply device 107 according to a seventh embodiment. In this example, unlike the switching power supply device 101 of the first embodiment, a bridge rectifying circuit is formed as a rectifying circuit, and resonant capacitors Cs1, Cs2, Cs3, and Cs4 are formed in parallel with rectifying diodes Ds1, Ds2, Ds3, and Ds4, respectively.

Operations and effects are similar to those described in the first embodiment. In particular, in the seventh embodiment, junction capacitances of the diodes Ds1, Ds2, Ds3, and Ds4 can be used as the resonant capacitors Cs1, Cs2, Cs3, and Cs4, and thus the number of components can be reduced.

Eighth Embodiment

Figure 9:
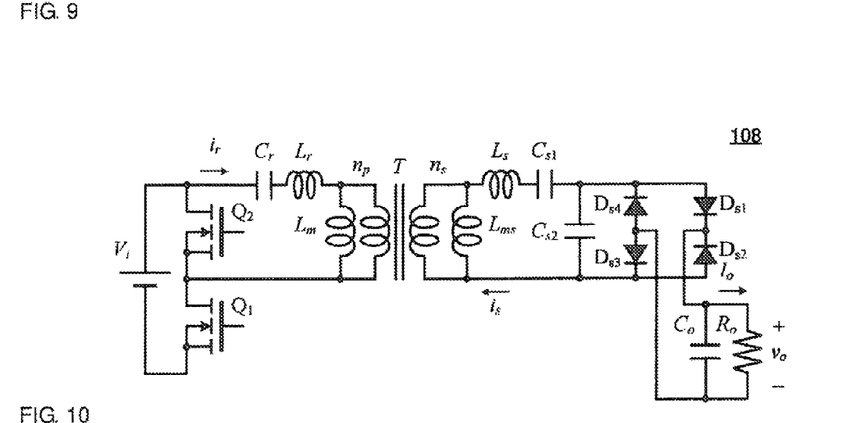
FIG. 9 is a circuit diagram of a switching power supply device 108 according to an eighth embodiment.

FIG. 9 is a circuit diagram of a switching power supply device 108 according to an eighth embodiment. In this example, unlike the switching power supply device 101 of the first embodiment, the capacitor Cs1 is connected in series with the inductor Ls, and the capacitor Cs2 is connected in parallel with the output.

Operations and effects are similar to those described in the first embodiment. In particular, in the eighth embodiment, the frequency fc can be set to a desired value, and withstanding voltages required for the rectifying elements (diodes Ds1, Ds2, Ds3, and Ds4) can be reduced. Consequently, a rectifying element with a small conduction loss can be used, which makes it possible to reduce the loss.

Ninth Embodiment

Figure 10:
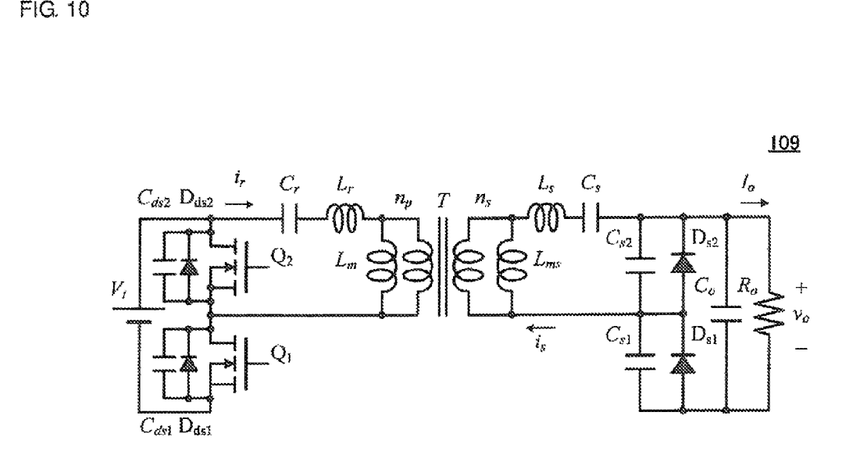
FIG. 10 is a circuit diagram of a switching power supply device 109 according to a ninth embodiment.

FIG. 10 is a circuit diagram of a switching power supply device 109 according to a ninth embodiment. In this example, unlike the switching power supply device 101 of the first embodiment, the rectifying circuit is constituted by a voltage doubling rectifying circuit. In addition, the capacitor Cs is connected in series with the inductor Ls, and the resonant capacitors Cs1 and Cs2 are formed so as to be in parallel with the rectifying diodes Ds1 and Ds2, respectively.

Operations and effects are similar to those described in the first embodiment. In particular, in the ninth embodiment, a high output voltage can be obtained through voltage doubling rectification, and junction capacitances of the diodes Ds1 and Ds2 can be used as the resonant capacitors Cs1 and Cs2.

Tenth Embodiment

Figure 11:
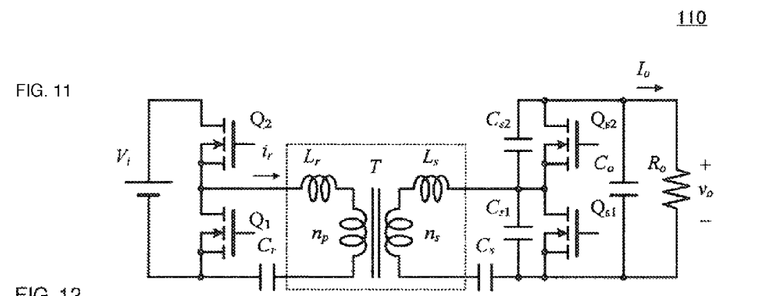
FIG. 11 is a circuit diagram of a switching power supply device 110 according to a tenth embodiment.

FIG. 11 is a circuit diagram of a switching power supply device 110 according to a tenth embodiment. In this example, unlike the switching power supply device 101 of the first embodiment, the resonant capacitors Cr and Cs, the mutual inductances (Lm and Lms), the primary winding np, and the secondary winding ns are formed at locations that are different from those of the ninth embodiment. In addition, leakage inductances of the winding are used as the inductors Lr and Ls, and the secondary side rectifying circuit is constituted by a synchronous rectifying circuit.

Operations and effects are similar to those described in the first embodiment. In particular, with the tenth embodiment, the following advantageous effects are obtained.

By arranging the resonant capacitors Cr and Cs, the primary winding np, and the secondary winding ns as appropriate, the area to be occupied by the mounted components can be utilized efficiently.

Setting the resonant capacitor Cr to a ground potential of the input side makes it easier to detect a voltage or a current of the resonant capacitor Cr, and controlling the switching element by detecting this voltage makes it possible to control the electric power. To detect the current, a capacitor with a small capacitance can be connected in parallel with the resonant capacitor Cr, and by detecting a current that flows through this capacitor with a small capacitance, the current that flows through the resonant capacitor Cr can be detected on the basis of a ratio corresponding to the capacitance ratio.

Using leakage inductances of the winding as the resonant inductors Lr and Ls makes it possible to reduce the number of components to thus reduce the power supply device in size and weight. In addition, using the mutual inductances between the windings as the resonant inductors (Lm, Lms) makes it possible to reduce the number of components to thus reduce the power supply device in size and weight.

Constituting the secondary side rectifying circuit by a synchronous rectifying circuit makes it possible to reduce a rectification loss. In addition, causing the switching element that forms the synchronous rectifying circuit to undergo a switching operation makes it possible to transmit electric power reception side energy, which in turn makes it possible to use an electric power reception side circuit as an electric power transmission circuit. In this manner, for example, bidirectional electric power transmission becomes possible.

Eleventh Embodiment

Figure 12:
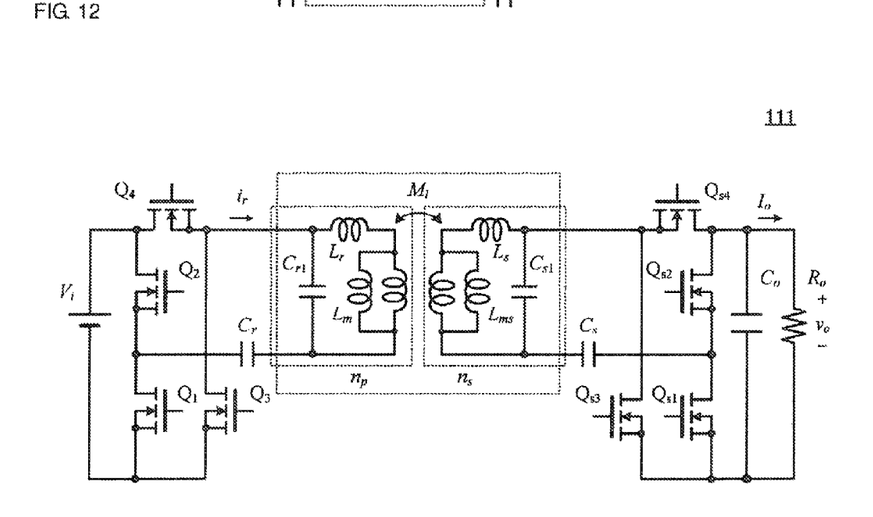
FIG. 12 is a circuit diagram of a switching power supply device 111 according to an eleventh embodiment.

FIG. 12 is a circuit diagram of a switching power supply device 111 according to an eleventh embodiment. This example differs from the switching power supply device 101 of the first embodiment in the following respects.

The leakage inductance of the primary winding np is used as the inductor Lr; the mutual inductance is used as the inductor Lm; and the winding capacitance is used as the capacitor Cr1. The leakage inductance of the secondary winding ns is used as the inductor Ls; the mutual inductance is used as the inductor Lms, and the winding capacitance is used as the capacitor Cs1.

The primary side alternating current voltage generation circuit is constituted by a full bridge circuit.

Self-resonant coils are used for the primary winding np and the secondary winding ns.

Instead of a magnetic core, an air core is used to couple the primary winding np and the secondary winding ns.

The rectifying circuit at the secondary side is constituted by a synchronous rectification bridge rectifying circuit.

Operations and effects are similar to those described in the first embodiment. In particular, in the eleventh embodiment, using the self-resonant coils for the primary winding and the secondary winding makes it possible to constitute the electric power transmission system in a simple manner. In addition, constituting the primary side alternating current voltage generation circuit or the rectifying circuit by a full bridge circuit allows the withstanding voltage required for the switching element to be reduced, which makes it possible to use a switching element with a small conduction loss. Consequently, a switching element with a small conduction loss can be used, which makes it possible to reduce the loss.

The invention claimed is:

1. A switching power supply device, comprising:
    a transformer including at least a primary winding and a secondary winding;
    a primary side circuit including
        a primary side resonant inductor formed so as to be equivalent to and in series with the primary winding,
        a primary side resonant capacitor forming, together with the primary side resonant inductor, a primary side resonant circuit, and
        a primary side alternating current voltage generation circuit including at least two switching elements and configured to generate a trapezoidal wave alternating current voltage from an input direct current power supply voltage and to provide the trapezoidal wave alternating current voltage to the primary side resonant circuit; and
    a secondary side circuit including
        a secondary side resonant inductor formed so as to be equivalent to and in series with the secondary winding,
        a secondary side resonant capacitor forming, together with the secondary side resonant inductor, a secondary side resonant circuit, and
        a secondary side rectifying circuit including a rectifying element and configured to rectify an alternating current outputted from the secondary side resonant circuit to obtain a direct current voltage,
    wherein a mutual inductance is formed equivalently through mutual induction between the primary winding and the secondary winding, and a multi-resonant circuit that includes a plurality of LC resonant circuits is formed at least by the primary side circuit and the secondary side circuit, and
    wherein, with the multi-resonant circuit,
    the primary side resonant circuit and the secondary side resonant circuit resonate with each other, and electric power is transmitted from the primary side circuit to the secondary side circuit through magnetic field resonant coupling in which a current flows in the mutual inductance;
    energy that is not transmitted from the primary winding is retained in the primary side resonant circuit as resonant energy through a resonance phenomenon;
    of energy which the secondary winding has received, energy that is not supplied to an output is retained in the secondary side resonant circuit as resonant energy through a resonance phenomenon; and
    the secondary side resonant circuit forms a current path that is different from a current path in which the rectifying element is formed in series to transmit electric power from the primary winding to the secondary winding.

2. The switching power supply device according to claim 1, wherein, when a switching frequency is represented by fs and a resonant frequency at which an input impedance seen by an input of the multi-resonant circuit connected to the primary side alternating current voltage generation circuit in a state in which a load is connected to an output of the secondary side circuit is represented by fa, the primary side alternating current voltage generation circuit operates within a range in which fa≤fs is satisfied to control electric power to be transmitted.

3. The switching power supply device according to claim 2, wherein, as the secondary side resonant circuit is provided, a predetermined frequency fc at which the switching power supply device operates while maintaining a resonant operation even in a no-load state in which a load is not connected to an output is set, and the switching power supply device operates within a range in which fa≤fs≤fc is satisfied to control electric power to be transmitted.

4. The switching power supply device according to claim 1, wherein the secondary side resonant capacitor is connected in parallel with the secondary winding, and the secondary side rectifying circuit rectifies a voltage at the secondary side resonant capacitor.

5. The switching power supply device according to claim 1, wherein the secondary side resonant capacitor is connected in series with the secondary winding, and the secondary side rectifying circuit rectifies a current in the secondary side resonant capacitor.

6. The switching power supply device according to claim 1, wherein the secondary side resonant capacitor is connected in parallel with the rectifying element that forms the secondary side rectifying circuit.

7. The switching power supply device according to claim 1, wherein the secondary side rectifying circuit is a bridge rectifying circuit.

8. The switching power supply device according to claim 1, wherein the secondary side rectifying circuit is a center tap rectifying circuit.

9. The switching power supply device according to claim 1, wherein the secondary side rectifying circuit is a voltage doubling rectifying circuit.

10. The switching power supply device according to claim 1, wherein the switching element is turned on when a voltage across two ends thereof falls to a zero voltage to carry out a zero voltage switching operation.

11. The switching power supply device according to claim 1, wherein the primary side resonant inductor or the secondary side resonant inductor is a leakage inductance of the primary winding or the secondary winding.

12. The switching power supply device according to claim 1, wherein a stray capacitance of the primary winding, together with the primary side resonant capacitor, forms the primary side resonant circuit, or a stray capacitance of the secondary winding, together with the secondary side resonant capacitor, forms the secondary side resonant circuit.

13. The switching power supply device according to claim 1, wherein a junction capacitance of the rectifying element is used as the secondary side resonant capacitor.

14. The switching power supply device according to claim 1, wherein a diode connected in parallel with the switching elements is provided.

15. The switching power supply device according to claim 14,
wherein the switching element is an FET; the diode connected in parallel is a parasitic diode of the FET; and a parasitic capacitance of the FET is used as a parallel capacitor.

16. The switching power supply device according to claim 1,
wherein a resonant frequency of the primary side resonant circuit is substantially equal to a resonant frequency of the secondary side resonant circuit.

17. The switching power supply device according to claim 1,
wherein the primary side alternating current voltage generation circuit is a circuit in which four switching elements are in full bridge connection.

18. The switching power supply device according to claim 1,
wherein the secondary side rectifying circuit is a synchronous rectifying circuit that rectifies in synchronization with a switching operation of the primary side alternating current voltage generation circuit.

* * * * *